July 8, 1924.
O. C. LARSON
AUTOMATIC SAFETY VALVE
Filed Feb. 28, 1923
1,500,587
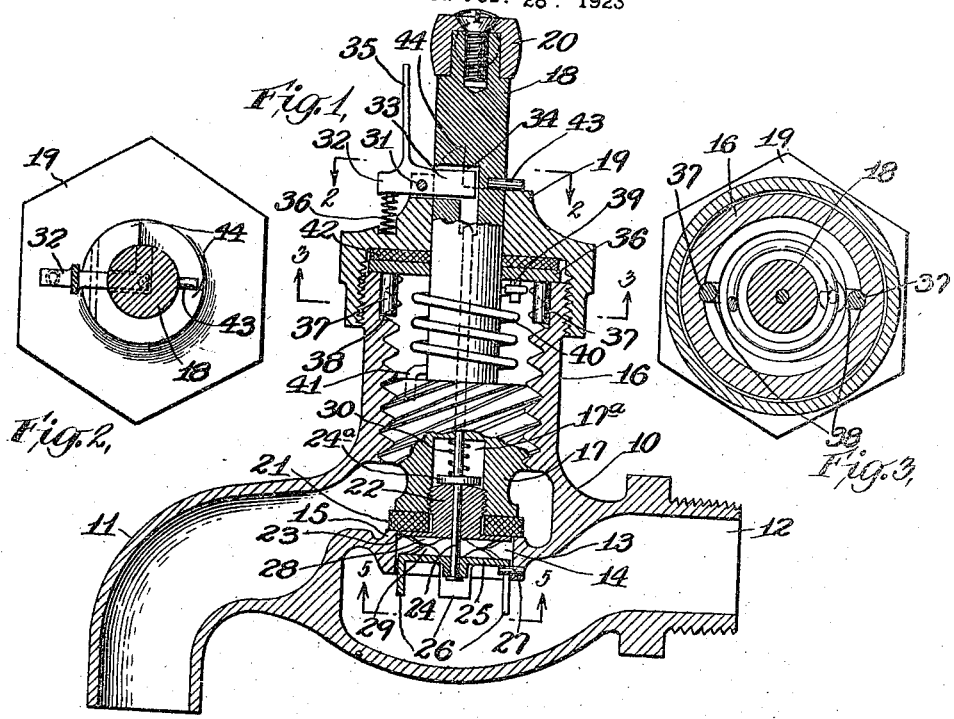
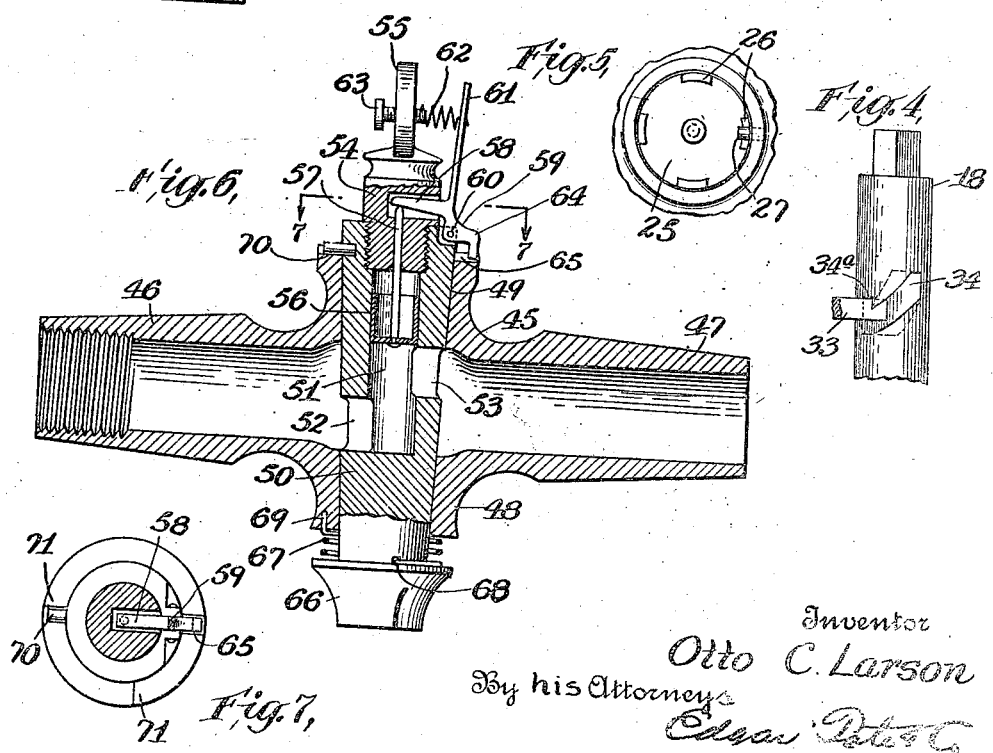
Inventor
Otto C. Larson
By his Attorneys Patented July 8, 1924.

1,500,587

UNITED STATES PATENT OFFICE.

OTTO C. LARSON, OF BROOKLYN, NEW YORK.

AUTOMATIC SAFETY VALVE.

Application filed February 28, 1923. Serial No. 621,753.

*To all whom it may concern:*

Be it known that I, OTTO C. LARSON, a citizen of the United States, and residing at Brooklyn, in the county of Kings and State of New York, have invented certain new and useful Improvements in Automatic Safety Valves, of which the following is a specification, such as will enable those skilled in the art to which it appertains to make and use the same.

This invention relates to valves of different kinds and classes and designed to control the passage of liquid, gas or the like through a pipe discharge nozzle or the like, and the object of the invention is to provide a valve device of the class described with a normally spring seated valve element and with means in the valve element for automatically locking and retaining said valve element in an open position, said means being actuated by the pressure of the fluid or gas through the valve element or the valve device in which said valve element is movably mounted; a further object being to provide means whereby when the liquid or gas pressure through the valve device ceases the valve element will be automatically released and moved into a closed position by the spring controlling the same; a further object being to provide a means for limiting the movement of said valve element; and with these and other objects in view the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a sectional view through a faucet and showing one form of valve element and valve element controlling means mounted therein;

Fig. 2 a partial section on the line 2—2 of Fig. 1;

Fig. 3 a partial section on the line 3—3 of Fig. 1;

Fig. 4 a detail view of a part of the construction shown in Fig. 1;

Fig. 5 a detail view looking in the direction of the arrows 4—4 of Fig. 1;

Fig. 6 a view similar to Fig. 1 and showing a modified form of construction; and, Fig. 7 a partial section on the line 6—6 of Fig. 5.

In Fig. 1 of the drawing I have shown one method of carrying my invention into effect, and in said figure 10 represents the body of a faucet or similar discharge having a tubular discharge nozzle 11 at one end and an externally threaded and flanged tubular extension 12 at the other end.

Centrally of the body 10 is formed a transverse partition wall 13 which divides the tubular end portions 11 and 12 into separate chambers, and the wall 13 is provided with an aperture 14 around which is formed a valve seat 15.

The body 10 is provided with an upwardly directed and internally threaded extension 16 having what is commonly known as a quick thread, and mounted in the extension 16 is an externally threaded body 17 of a valve element which is threaded to correspond with the threads of the extension 16.

The valve element 17 is provided with an upwardly directed stem 18 which passes through and projects above a cap 19 detachably mounted upon the extension 16, and on top of the stem 18 is secured a handle member 20. At the lower end of the valve element 17 is mounted a packing ring 21 adapted to rest upon the seat 15, and said ring is held in place by a plug 22 having a flanged head 23 which cooperates with the ring 21. Movably mounted in the plug 22 and in the stem 18 is a rod 24 to the lower end of which is fixed a supplemental valve element 25 comprising a disk having a plurality of downwardly directed guide fins 26, one of which is slightly longer than the others and is slotted to receive a pin 27 mounted in the wall 13 to key the supplemental valve 25 against rotation. The bottom face of the flanged head 23 of the plug 22 is provided with four equally spaced downwardly extending curved cam faces 28, and the top face of the supplemental valve 25 is provided with similar upwardly directed cam faces 29 which when the valve element 17 is in its closed position normally assume the position shown in Fig. 1 of the drawing.

The rod 24 is provided within a chamber 17ª of the valve element with an enlargement 24ᵃ which retains the supplemental valve 25 against displacement and also provides a seat for a light spring 30.

Pivotally mounted in connection with one side of the cap 19 as shown at 31 is a catch device 32 having a part 33 which extends into an aperture 34 in the stem 18 to permit of the operation of the upper end of the rod 24 in connection therewith, and the other end of the catch device 32 is provided with an upwardly directed finger piece 35, and said end portion also operates in connection with a spring 36 mounted in a recess in the cap 19. The aperture 34 in the stem 18 is curved laterally and downwardly as clearly shown in Fig. 4 and is provided with an offset portion 34ᵃ into which the end 33 of the catch device 32 is adapted to move to lock the stem 18 against rotation, as hereinafter set out and the curvature of the aperture 34 corresponds with the pitch of the teeth in the extension 16 and on the valve element 17.

Mounted between the top face of the extension 16 and the inner face of the cap 19 is a ring 36ᵃ having two downwardly directed pins 37 which operate in connection with recesses 38 on the inner threaded face of the extension 16 to key the ring 36ᵃ against rotation, and said ring is provided with another downwardly directed pin 39 in connection with which one end of a heavy coil spring 40 is mounted, the other end of said spring being mounted in connection with the valve element or body 17 thereof, as shown at 41. The spring 40 normally serves to hold the valve element 17 in its closed position or with the packing 21 seated upon the valve seat 15 as shown in Fig. 1 and in opening the valve by rotating the stem 18 through the handle member 20 the tension of the spring 40 is increased as will be apparent. A gasket 42 is also preferably placed between the ring 36ᵃ and the cap 19 as clearly shown in Fig. 1 of the drawing. A pin 43 is mounted in connection with the stem 18 and operates in connection with stops 44 to limit the rotation of said stem, and one of these stops will be higher than the other to compensate for the raising of the stem 18.

The operation and use of my improved valve as shown in Figs. 1 to 4 inclusive will be readily understood from the foregoing description when taken in connection with the accompanying drawing and the following statement. The position of the valve as shown in Fig. 1 of the drawing constitutes the normal or closed position, and when it is desired to open the valve the handle member 20 on the stem 18 is rotated one-quarter of a revolution, in which operation the body 17 rises in the extension 16 and also correspondingly moves the gasket or packing ring 21 from the seat 15 and the supplemental valve 25 will be approximately raised and the pressure of the gas or liquid which is intended to be passed through the valve will raise the supplemental valve 25 against the tension of the springs 30 and 36, and the extension 33 of the catch device 32 will be moved into the recess or offset portion 34ᵃ in the aperture 34 and operate to lock or retain the valve in its open position. In the above operation the one-quarter revolution of the body 17 of the valve element will move the projections or cam faces 23 into line with the recesses formed between the corresponding projections 29 to permit of the upward movement of the supplemental valve 25. As long as the pressure is present on the intake end of the valve or, in other words, as long as the gas or liquid is passing therethrough the valve will be retained in its open position, but should this pressure or flow cease the springs 30 and 36 will operate to move the supplemental valve 25 downwardly and release the catch device 32 from the notch or recess 34ᵃ and the spring 40 will then automatically operate to return the valve element 17 to its closed position. It will also be understood that by pressing upon the valve piece 35 to disengage the catch device from the recess 34ᵃ the valve may be closed at will, the spring 40, in the last named operation, serving to close and seat the valve element.

In Figs. 6 and 7 of the drawing I have shown a slight modification of the construction shown in Figs. 1 to 5 inclusive, in which a valve body 45 is shown, said body having laterally directed tubular extensions 46 and 47, the extension 46 constituting the intake end of the valve and centrally of the body 45 is an enlarged body portion 48 which extends at right angles to the extensions 46 and 47, said body being provided with a tapered bore 49 in which a tapered valve element 50 is mounted.

The valve element 50 is provided with a bore 51 having passages 52 and 53 which are adapted to register with the extensions 46 and 47 respectively, and the bore 51 opens outwardly through the top of the valve element and is closed by a plug 54 having a finger piece 55 by means of which the valve element 50 may be rotated. Mounted in the bore 51 of the valve element is a supplemental valve 56 having a stem 57 which is adapted to extend up through a bore in the plug 54 to operate in connection with an arm 58 at one end of a catch device 59 pivoted to the valve element 50 as shown at 60, said end of the catch device being also provided with a finger piece 61 with which is connected a spring 62 which also connects with an adjustment screw 63 mounted in the finger piece 55. The other end of the catch device 59 is provided with a downwardly directed finger 64 adapted to enter a recess 65 in the top face of the body 48 of the valve 45.

The lower end of the valve element 50 projects beyond the body 48 and is provided with a head 66 and a spiral spring 67 is mounted upon the extension of the valve element 50, and one end of said spring is secured thereto as shown at 68 and the other end of said spring is secured to the body 48 as shown at 69. A pin 70 is mounted in the valve element 50 at the top thereof and co-operates with stops 71 on the top face of the body 48 to limit the movement of said valve element.

The operation of the valve shown in Figs. 6 and 7 will be somewhat the same as with the valve shown in Fig. 1 of the drawing, but the valve element 50 rotates in its supports but does not move vertically therein, and the position of the parts shown in Fig. 6 of the drawing shows the valve in its open position and with the catch device 59 retaining the valve in such position. When the pressure on the intake end of the valve ceases, or the flow of gas or a suitable liquid ceases the spring 52 will operate to move the supplemental valve 56 downwardly and to disengage the catch device 59, and the spring 67 will operate to rotate the valve element 50 to move the same into a closed position with the ports 52 and 53 thereof at right angles to the position shown in the drawing. The spring 57 while operating to automatically close the valve element 50 also operates to retain the valve element 50 in a seated position in the tapered bore 49, said spring serving to exert slight downward pressure on the head 66 to accomplish this result.

From the foregoing it will be apparent that the principal features of my invention reside in the position of the valve of any kind or class, the valve element of which is spring-controlled or spring-actuated with an auxliary or supplemental valve actuated by the pressure or flow of a liquid or gas through the valve to retain the valve element in its open position as long as the flow or pressure travels but in the event that the pressure or flow shall cease the valve element will be released and automatically closed. This type of valve will be of great value in gas pipes of various kinds and classes controlling gas burner devices, stoves or other gas appliances and also in water, fuel or other pipes controlling the flow of water or other liquids through pipes or other discharge devices, such for example as faucets, and while I have shown certain details of construction for carrying my invention into effect, it will be understood that I am not necessarily limited to these details, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A valve device of the class described comprising a valve body, a valve element movably mounted therein and adapted to control the communication through the body of the valve device, a supplemental pressure actuated valve supported by said valve element, and a catch device for retaining said valve element in an open position, said supplemental valve cooperating with the catch device to move the same into operative position.

2. A valve device of the class described comprising a valve body, a valve element movably mounted therein and adapted to control the communication through the body of the valve device, a supplemental pressure actuated valve supported by said valve element, a catch device for retaining said valve element in an open position, said supplemental valve cooperating with the catch device to move the same into operative position, and tensional means for normally holding the catch device in an inoperative position.

3. A valve device of the class described comprising a valve body, a valve element movably mounted therein and adapted to control the communication through the body of the valve device, a supplemental pressure actuated valve supported by said valve element, a catch device for retaining said valve element in an open position, said supplemental valve cooperating with the catch device to move the same into operative position, tensional means for normally holding the catch device in an inoperative position, and tensional means for automatically moving the valve element into a closed position.

4. A valve of the class described comprising a movable valve element adapted to control the communication through the body of the valve, and a supplemental valve mounted in connection with and supported by said valve element and adapted to be automatically actuated by the flow of a gas or fluid through said valve element.

5. A valve of the class described comprising a movable valve element adapted to control the communication through the body of the valve, a supplemental valve mounted in connection with and supported by said valve element and adapted to be automatically actuated by the flow of a gas or fluid through said valve element, and means adapted to be actuated by said supplemental valve for retaining the first named valve in an open position.

6. A valve of the class described comprising a movable valve element adapted to control the communication through the body of the valve, a supplemental valve mounted in connection with and supported by said valve element and adapted to be automatically actuated by the flow of a gas or fluid through said valve element, means adapted to be actuated by said supplemental valve for retaining the first named valve in an open position, and means whereby the releasing of said last named means will automatically move said first named valve into a closed position.

7. A valve device of the class described comprising a valve body, a main valve movably mounted in said body and adapted to control the passage of a gas or fluid substance therethrough, tensional means for normally holding said valve in a closed position, automatically actuated means mounted in connection with and supported by said main valve for retaining the same in an open position, and said last named means being exposed to the gas or fluid substance passed through the valve device whereby when the flow of the substance ceases, said last named means will release said valve, and said last named means involving a supplemental valve.

8. A valve device of the class described comprising a valve body, a main valve movably mounted in said body and adapted to control the passage of a gas or fluid substance therethrough, tensional means for normally holding said valve in a closed position, automatically actuated means mounted in connection with and supported by said main valve for retaining the same in an open position, and said last named means being exposed to the gas or fluid substance passed through the valve device whereby when the flow of the substance ceases, said last named means will release said valve, said last named means involving a supplemental valve, and a catch device.

9. A valve device of the class described comprising a valve body, a main valve movably mounted in said body and adapted to control the passage of a gas or fluid substance therethrough, tensional means for normally holding said valve in a closed position, automatically actuated means mounted in connection with and supported by said main valve for retaining the same in an open position, and said last named means being exposed to the gas or fluid substance passed through the valve device whereby when the flow of the substance ceases, said last named means will release said valve, said last named means involving a supplemental valve, a catch device, and tensional means for normally holding the catch device in predetermined position.

10. A valve device of the class described comprising a valve body, a rotatable valve mounted in said body and adapted to control the flow of a gas or liquid substance therethrough, tensional means for normally holding said valve in a closed position, a supplemental valve supported by the main valve and movable relatively thereto, a catch device for the main valve in connection with which said supplemental valve operates for retaining said first named valve in an open position, said supplemental valve being exposed to the substance passed through the body of the valve device whereby when the flow of the substance ceases, the first named valve will be released.

11. A valve device of the class described comprising a valve body, a rotatable valve mounted in said body and adapted to control the flow of a gas or liquid substance therethrough, tensional means for normally holding said valve in a closed position, a supplemental valve supported by the main valve and movable relatively thereto, a catch device for the main valve in connection with which said supplemental valve operates for retaining said first named valve in an open position, said supplemental valve being exposed to the substance passed through the body of the valve device whereby when the flow of the substance ceases, the first named valve will be released, and a spring cooperating with said catch device.

In testimony that I claim the foregoing as my invention I have signed my name this 24th day of Feb., 1923.

OTTO C. LARSON.